INVENTORS
EUGENE W. PEARSON
ARTHUR L. PEDERSEN
BY

THEIR ATTORNEYS

Aug. 25, 1964 E. W. PEARSON ETAL 3,145,602
RAKE ANGLE CONTROL MEANS FOR POWER SHEARS AND LIKE MACHINES
Filed Dec. 14, 1961 3 Sheets-Sheet 3
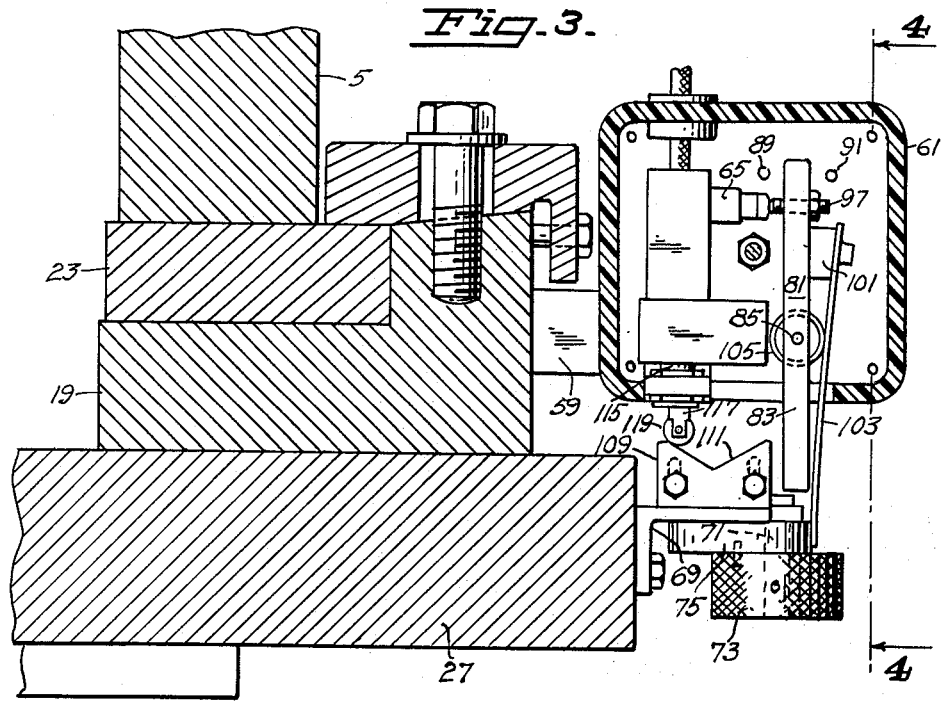
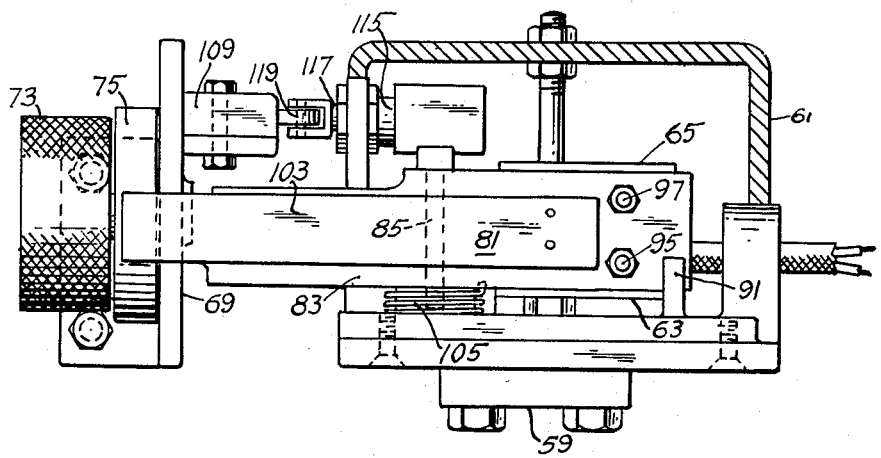
INVENTORS
EUGENE W. PEARSON
ARTHUR L. PEDERSEN
BY
Bruce & Brosler
THEIR ATTORNEYS

United States Patent Office 3,145,602
Patented Aug. 25, 1964

3,145,602
RAKE ANGLE CONTROL MEANS FOR POWER SHEARS AND LIKE MACHINES
Eugene W. Pearson, Orinda, and Arthur L. Pedersen, Oakland, Calif., assignors to Pacific Industrial Manufacturing Co., a corporation of California
Filed Dec. 14, 1961, Ser. No. 160,415
8 Claims. (Cl. 83—62)

Our invention relates to power shears and like machines utilizing a reciprocating ram which carries a work engaging tool, and more particularly, control means for adjusting the angle at which such tool approaches and engages the work, such angle being generally termed the rake angle.

Among the objects of our invention are:

(1) To provide a novel and improved power shear and like machine of the type utilizing a reciprocating ram;

(2) To provide a novel and improved power shear and like machine of the foregoing type with novel and improved control of the rake angle of the ram;

(3) To provide a novel and improved rake angle control means for a power shear and the like.

Additional objects of my invention will be brought out in the following description of a preferred embodiment of the same, taken in conjunction with the accompanying drawings, wherein:

FIGURE 3 is a view taken in the plane 3—3 of FIGURE 2 and depicting in plan, the control means of the present invention, with the cover removed;

FIGURE 4 is a side view in elevation of the control means of the present invention.

Figure 1:
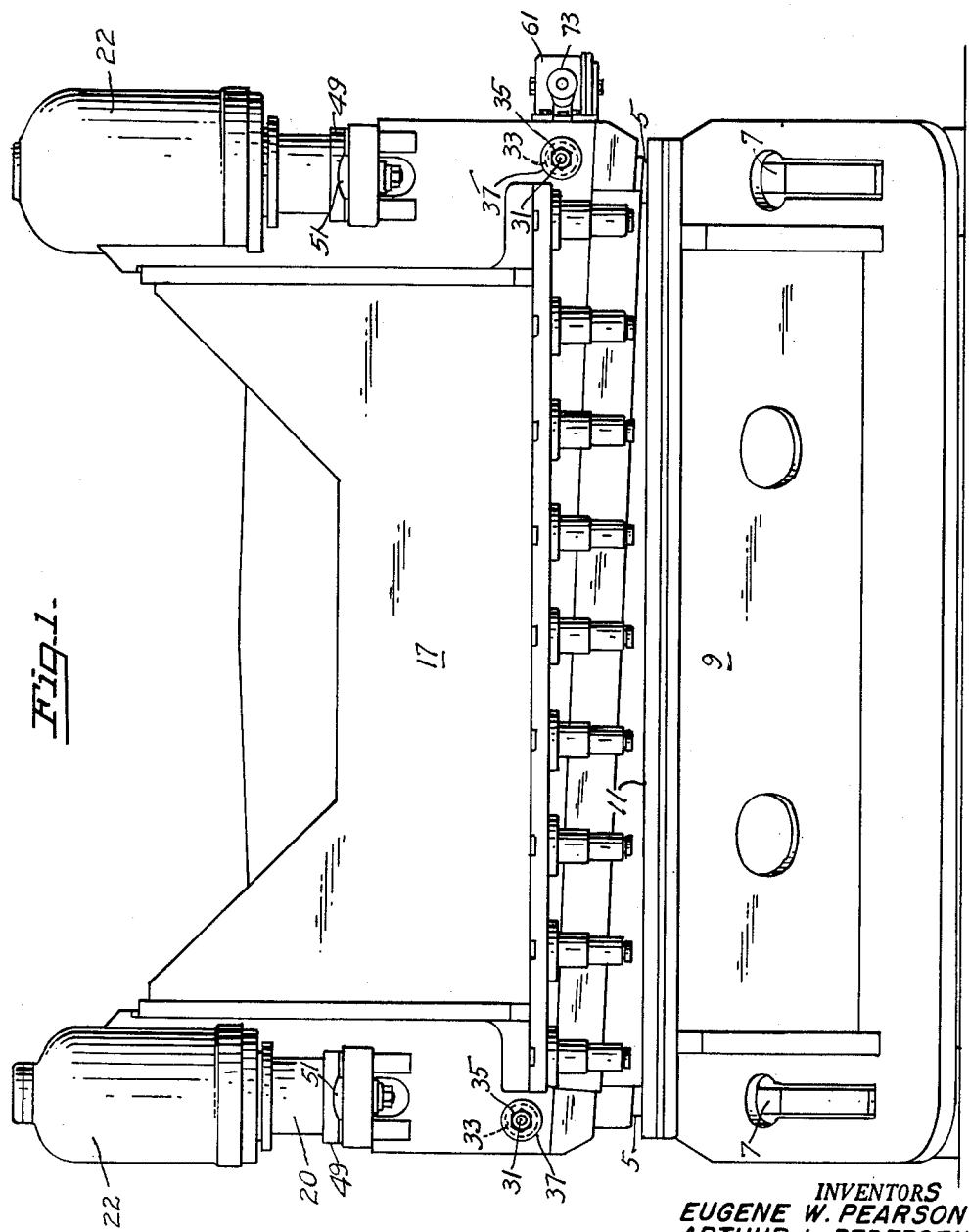
FIGURE 1 is a front view in elevation of a machine to which the present invention is applicable.
Figure 2:
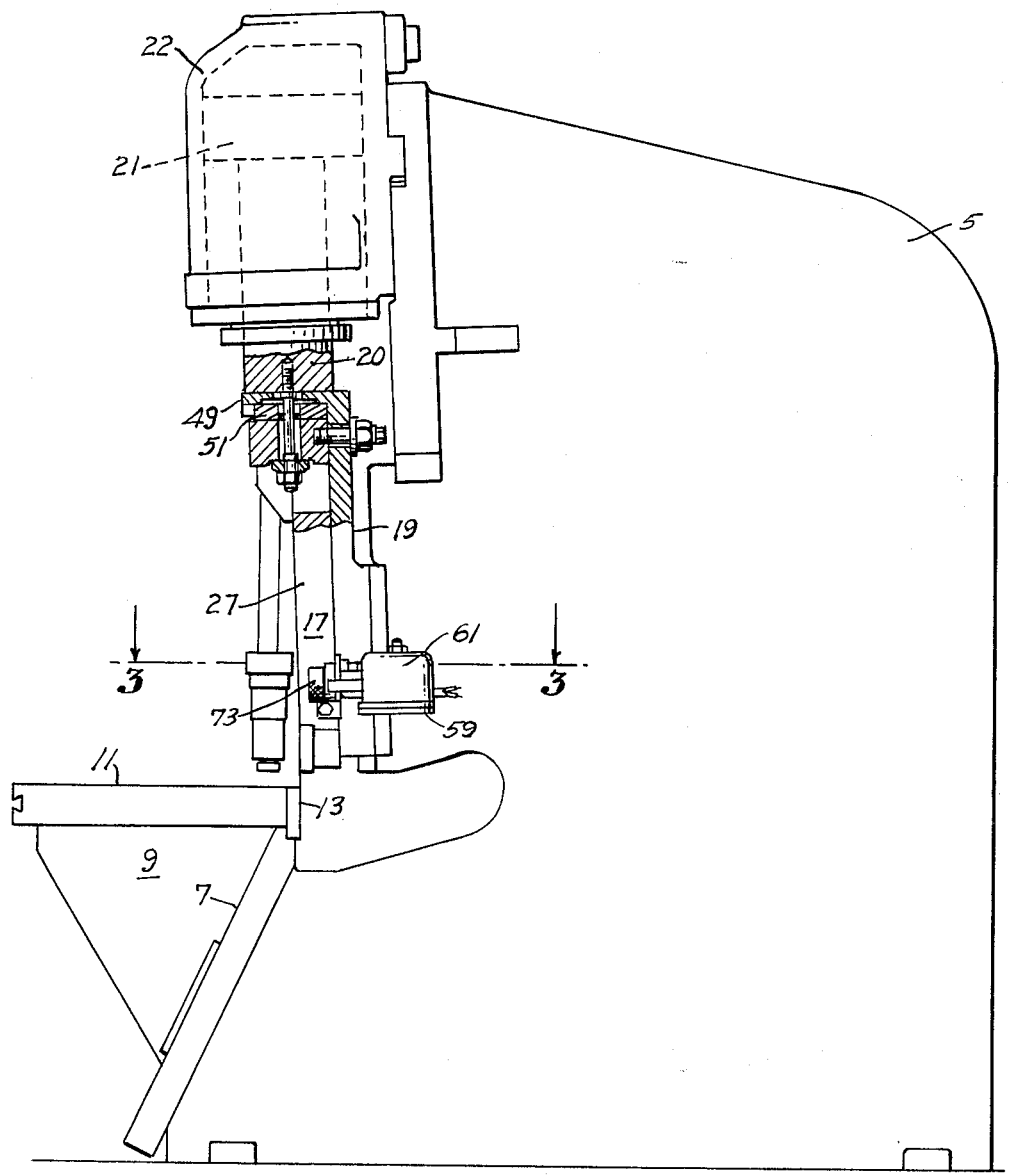
FIGURE 2 is a side view in elevation of such a machine as depicted in FIGURE 1, with the present invention applied thereto.

Referring to the drawings for details of our invention in its preferred form, we have illustrated the same as applied to a machine of the power shear type involving spaced side housings 5 having lower sloping front edges 7 for adjustably supporting a work table assembly 9. Such work table assembly includes a work table 11 and a fixed blade 13 along the rear edge of said table.

For cooperation with the fixed blade in the severance of work such as sheet metal, is a reciprocating ram assembly 17. Such reciprocating ram assembly includes a pair of slide elements 19 each affixed at its upper end to the lower and of a piston rod 20 associated with a drive piston 21 in a power cylinder 22. The slide is slidably held to a guideway 23 affixed to the upper front edge of each of the side housings 5. A ram element 27 is pivotally secured at each upper corner to the proximate piston rod 20 and held in sliding contact with the proximate slide element 19, by providing each slide element with a mounting bolt 31 extending through an oversized hole 33 in the ram of a diameter to permit of a desired range of rake angle adjustments, and a nut 35 and intervening washer 37 of sufficient diameter to more than cover the hole through the ram at that location.

In effecting such coupling to the drive piston, each upper corner of the ram is bolted to the lower end of the piston rod through a flange 49 which is formed integrally with the slide. Intermediate each upper corner of the ram and the proximate slide flange is a pressure block 51 having an arcuate convex surface in complementary relationship with a recess in the adjacent side of the proximate flange 49. Thus, while each slide and the adjacent end of the ram are subject to linear reciprocal movement by the piston located at that end, the ram being also pivotally connected to the proximate piston rod, is also capable of angular shift in response to a difference in rate of travel of the drive pistons, and due to the elevated location of the pivot attachments of the ram to the pison rods, and angular rotation of the ram will cause a substantial swing at the lower corners thereof.

The rake angle control means of the present invention is mounted in part on one of the slide elements 19 and in part on the proximate end of the ram. Mounted on the slide element by means of a bracket 59, is a micro-switch box or housing 61 in which is a pair of vertically stacked micro-switches 63, 65, one such as micro-switch 65 for example being of the normally closed contact type while the other, 63, has its contacts normally open.

Affixed to the proximate edge of the ram, in substantially the horizontal plane between the stacked micro-switches, is a bracket 69 having a rotatable shaft 71 and knob 73 secured at the end thereof, with a disk type cam 75 intermediate the knob and bracket and affixed to the knob for rotation therewith.

Extending from the cam to the micro-switches through the intermediate wall of the micro-switch box 61 is a micro-switch actuating means assembly 81 which is made responsive to adjustments of the cam 75. Such micro-switch actuating means assembly involves a lever 83 fulcrumed at an intermediate point thereof, on a pin 85 extending upwardly from the floor of the micro-switch box. This lever at one end extends slightly beyond the micro-switches 63, 65, and is limited in its angular movement about its fulcrum pin, by a pair of stops 89, 91 anchored to the floor of the micro-switch box to either side of that end of the lever.

Adjacent this same end of the lever, are mounted a pair of adjustable switch actuating pins 95, 97 each associated with one of the micro-switches 63, 65. At its other end, the lever 83 terminates short of the cam 75.

At a location intermediate the fulcrum pin 85 and the micro-switch engaging end of the lever, is a wedge shaped mounting block 101 for angularly mounting an overriding spring 103, which extends towards the cam 75 and at its cam end is adapted to contact the surface of the cam. It is maintained in pressure contact with the surface of the cam by a torsion spring 105 disposed about the fulcrum pin 85 and anchored at its lower end to the floor of the micro-switch box and, at its other end, bears against the lever in a direction tending to swing the micro-switch end of this lever away from engagement with the micro-switch. Such torsional movement of the lever is resisted by the overriding spring.

The circuit which includes the stacked micro-switches 63, 65, is not part of the present invention. Such circuit may be of any suitable character, but preferably would correspond to that illustrated and described in the pending application of Eugene W. Pearson for Shear Machine With Adjustable Ram, Serial No. 704,923, filed December 24, 1957. With these micro-switches connected in such circuit, the ram will remain at a prevailing rake angle so long as the micro-switches are both in open condition. When one of the micro-switches is closed and the other one is open, the circuit will function to bring about angular rotation of the ram in one direction until the closed micro-switch is opened and thus reestablish the condition where both of them are open. When the other micro-switch is closed to the exclusion of the first one, the ram will be caused to rotate in the reverse direction until such other micro-switch is opened. Such operation of the micro-switches may, in general, be realized by readjusting the screw 97 into engagement with its normally closed micro-switch 65, sufficiently to open its contacts, while adjusting screw 95 will be adjusted to a close proximity position with respect to its normally open micro-switch 63. This represents a neutral position of the cam and associated switch actuating means, wherein both switches will be in open position.

Accordingly, the cam adjustment of the present invention is such as to permit altering the position of the actuating means, within a range from a position closing one of the micro-switches to the exclusion of the other, through the neutral position with both switches open, to a position closing the other said micro-switch to the exclusion of the first micro-switch. The extent to which the ram will alter its rake angle will depend on the extent to which the lever 83 is effectively adjusted to one side or the other of the neutral position by rotation of the cam 75, for it will be noted, that the resulting angular rotation of the ram 27 will cause the cam to swing with the ram, and in a direction which will ultimately restore the lever to its neutral position, at which time the ram will come to a halt.

Were the overriding spring 103 eliminated and the lever 83 itself extended to bear on the surface of the cam, the adjustment of the cam 75 would have to follow the movements of the ram, practically in synchronization therewith, which would be a slow and tedious operation. The inclusion of the overriding spring enables one to predict in advance, the rake angle to which one desired to adjust the ram, and the cam may therefore be adjusted quickly and to a precalibrated position, and without the necessity of coordinating such adjustment of the cam with movement of the ram.

To preclude overtravel of the ram to the point where it might result in excessive damage to the machine, we mount on the cam supporting bracket and facing the micro-switch box, a block 109 having a V-notch or recess 111 in the side facing the micro-switch box. In the micro-switch box, there is positioned a micro-switch 115 facing the block, and having an actuator 117 terminating in a roller 119 riding the surface of the recess.

This micro-switch has normally open contacts which are adapted to be actuated to closed condition, only as the roller 119 rides the upper ends of the sloping surfaces of the recess 111. Such extreme travel of the roller can occur only when the ram swings in either direction beyond the limits of rake angle adjustment provided for by the previously described rake angle adjustment means, and when such condition occurs, power is removed from the machine to bring its operation to a halt before damage can occur. Any circuit for accomplishing this may be relied on, but a preferred circuit for this purpose is included in the aforementioned application of Eugene W. Pearson, such circuit being shown in conjunction with the circuit for angularly shifting the ram in adjusting the rake angle thereof.

While the two micro-switches 63, 65 employed in conjunction with adjusting the rake angle of the ram, have been illustrated and described in stacked relationship and to one side of the actuating lever 83, it is apparent that the lever may be adjusted to a neutral position between two like micro-switches having normally open contacts, along the lines indicated in the aforementioned application of Eugene W. Pearson in connection with rake angle control circuit illustrated and described therein.

Accordingly, while we have illustrated and described our invention in its preferred form, and in considerable detail, the same is susceptible to alteration and modification without departing from the underlying principles involved, and we accordingly do not desire to be limited in our protection to the specific apparatus illustrated and described except as may be necessitated by the appended claims.

We claim:
1. A machine having a pair of spaced guideways and reciprocable drive pistons,
   a ram assembly including a slide element slidably maintained on each of said guideways and coupled to one of said drive pistons,
   a ram element pivotally supported with respect to said slide elements, at each upper corner from one of said drive pistons and maintained adjacent said slide elements, to permit change in the rake angle of said ram element,
   and means for initiating a change in such rake angle,
   said means including a pair of switches carried by one of said elements, and
   means carried by another of said elements in proximity to said switches and selectively preadjustable to actuate one of said switches for a period of time necessary to angularly shift said ram element from a prevailing rake angle to a different but desired rake angle.

2. A machine having a pair of spaced guideways and reciprocable drive pistons,
   a ram assembly including a slide element slidably maintained on each of said guideways and coupled to one of said drive pistons,
   a ram element pivotally supported with respect to said slide elements, at each upper corner from one of said drive pistons and maintained adjacent with slide elements, to permit change in the rake angle of said ram element,
   and means for initiating a change in such rake angle,
   said means including a pair of micro-switches carried by one of said elements, and
   means carried by another of said elements in proximity to said micro-switches and selectively preadjustable to actuate one of said micro-switches to the exclusion of the other and for a period of time necessary to angularly shift said ram element from a prevailing rake angle to a different but desired rake angle.

3. A machine having a pair of spaced guideways and reciprocable drive pistons,
   a ram assembly including a slide element slidably maintained on each of said guideways and coupled to one of said drive pistons,
   a ram element pivotally supported with respect to said slide elements, at each upper corner from one of said drive pistons and maintained adjacent said slide elements, to permit change in the rake angle of said ram element,
   and means for initiating a change in such rake angle,
   said means including a pair of micro-switches carried by one of said elements, and
   means carried by another of said elements in proximity to said micro-switches and selectively preadjustable to actuate one of said micro-switches to the exclusion of the other and for a period of time necessary to angularly shift said ram element from a prevailing rake angle to a different but desired rake angle,
   said last means being responsive to the arrival of said ram element to its desired rake angle for restoring said micro-switch to its non-actuated condition.

4. A machine having a pair of spaced guideways and reciprocable drive pistons,
   a ram assembly including a slide element slidably maintained on each of said guideways and coupled to one of said drive pistons,
   a ram element pivotally supported with respect to said slide elements, at each upper corner from one of said drive pistons and maintained adjacent said slide elements, to permit change in the rake angle of said ram element,
   means for use in determining the rake angle of said ram, comprising,
   a pair of switches supported by one of said slide elements,
   an adjustable cam supported by said ram element in the vicinity of said pair of switches,
   switch actuating means carried by said one slide element with one end terminating in actuating proximity to said switches and its other end in engagement with said cam,
   said switch actuating means being adapted to respond to preadjustments of said cam to enable altering of the position of said actuating means within a range from a position closing one of said micro-switches to the exclusion of the other, through a neutral position, to a position closing the other micro-switch to the exclusion of the first micro-switch.

5. A machine having a pair of spaced guideways and reciprocable drive pistons, a ram assembly including a slide element slidably maintained on each of said guideways and coupled to one of said drive pistons, a ram element pivotally supported with respect to said slide elements, at each upper corner from one of said drive pistons and maintained adjacent said slide elements, to permit change in the rake angle of said ram element, means for use in determining the rake angle of said ram, comprising, a pair of switches supported by one of said slide elements, an adjustable cam supported by said ram element in the vicinity of said pair of switches, switch actuating means carried by said one slide element with one end terminating in actuating proximity to said switches and its other end in engagement with said cam, said actuating means including a lever bar fulcrumed at an intermediate point and extending at one end across said switches and at its other end terminating short of said cam, and an overriding cantilever spring affixed to said lever bar and extending beyond said other end thereof across and in contact with said cam, said overriding cantilever spring enabling said actuating means to respond to preadjustments of said cam to assure actuation of a selected one of said micro-switches for a period of time necessary to angularly shift said ram element from a prevailing rake angle to a different but desired rake angle.

6. A machine having a pair of spaced guideways and reciprocable drive pistons, a ram assembly including a slide element slidably maintained on each of said guideways and coupled to one of said drive pistons, a ram element pivotally supported with respect to said slide elements, at each upper corner form one of said drive pistons and maintained adjacent said slide elements, to permit change in the rake angle of said ram element, means for use in determining the rake angle of said ram, comprising, a pair of micro-switches supported by one of said slide elements, an adjustable cam supported by said ram element in the vicinity of said pair of micro-switches, micro-switch actuating means carried by said one slide element with one end terminating in actuating proximity to said micro-switches and its other end in proximity to said cam, said actuating means including a lever bar fulcrumed at an intermediate point and extending at one end across said micro-switches and at its other end terminating short of said cam, and an overriding cantilever spring affixed to said lever bar and extending beyond said other end thereof across said cam, and means biasing said actuating means with said overriding spring engaging said cam said overriding cantilever spring enabling said actuating means to respond to preadjustments of said cam to assure actuation of a selected one of said micro-switches for a period of time necessary to angularly shift said ram element from a prevailing rake angle to a different but desired rake angle.

7. A machine having a pair of spaced guideways and reciprocable drive pistons, a ram assembly including a slide element slidably maintained on each of said guideways and coupled to one of said drive pistons, a ram element pivotally supported with respect to said slide elements, at each upper corner from one of said drive pistons and maintained adjacent said slide elements, to permit change in the rake angle of said ram element, means for use in determining the rake angle of said ram, comprising, a pair of micro-switches supported by one of said slide elements, an adjustable cam supported by said ram element in the vicinity of said pair of micro-switches, micro-switch actuating means carried by said one slide element with one end terminating in actuating proximity to said micro-switches and its other end in proximity to said cam, said actuating means including a lever bar fulcrummed at an intermediate point and extending at one end across said micro-switches and at its other end terminating short of said cam, and an overriding cantilever spring affixed to said lever bar and extending beyond said other end thereof across said cam, means biasing said actuating means with said overriding spring engaging said cam, and means independently of the prevailing rake angle of said ram element, for manually adjusting said cam to alter the position of said actuating means within a range from a position closing one of said micro-switches to the exclusion of the other, through a neutral position with both switches open, to a position closing the other of said switches to the exclusion of the first switch, said overriding cantilever spring enabling said actuating means to response to preadjustments of said cam to assure actuation of a selected one of said micro-switches for a period of time necessary to angularly shift said ram element from a prevailing rake angle to a different but desired rake angle.

8. A machine having a pair of spaced guideways and reciprocable drive pistons, a ram assembly including a slide element slidably maintained on each of said guideways and coupled to one of said drive pistons, a ram element pivotally supported with respect to said slide elements, at each upper corner from one of said drive pistons and maintained adjacent said slide elements, to permit change in the rake angle of said ram element, means for use in determining the rake angle of said ram, comprising, a pair of micro-switches supported by one of said slide elements, an adjustable cam supported by said ram element in the vicinity of said pair of micro-switches, micro-switch actuating means carried by said one slide element with one end terminating in actuating proximity to said micro-switches and its other end in proximity to said cam, said actuating means including a lever bar fulcrummed at an intermediate point and extending at one end across said micro-switches and at its other end terminating short of said cam, and an overriding cantilever spring affixed to said lever bar and extending beyond said other end thereof across said cam, means biasing said actuating means with said overriding spring engaging said cam, means independently of the prevailing rake angle of said ram element, for manually adjusting said cam to alter the position of said actuating means within a range from a position closing one of said micro-switches to the exclusion of the other, through a neutral position with both switches open, to a position closing the other of said switches to the exclusion of the first switch, said overriding cantilever spring enabling said actuating means to respond to preadjustments of said cam to assure actuation of a selected one of said micro-switches for a period of time necessary to angularly shift said ram element from a prevailing rake angle to a different but desired rake angle, a third micro-switch supported by said one slide element, and means on said ram element for actuating said third micro-switch, when said ram element alters its rake angle in either direction beyond predetermined limits representing the permissible range of rake angle adjustments.

References Cited in the file of this patent

UNITED STATES PATENTS

| | | |
|---|---|---|
| 1,569,569 | Pels | Jan. 12, 1926 |
| 2,400,996 | Iversen | May 28, 1946 |
| 2,603,145 | Dreis | July 15, 1952 |
| 2,781,844 | Pearson | Feb. 19, 1957 |
| 2,793,584 | Pearson | May 28, 1957 |

FOREIGN PATENTS

| | | |
|---|---|---|
| 616,457 | Canada | Mar. 14, 1961 |